July 23, 1946.                J. LEVINE ET AL                2,404,386
            DEVICE TO AID TEACHING OF AUTOMATIC RADIO COMPASS
                    Filed March 22, 1945        3 Sheets-Sheet 2
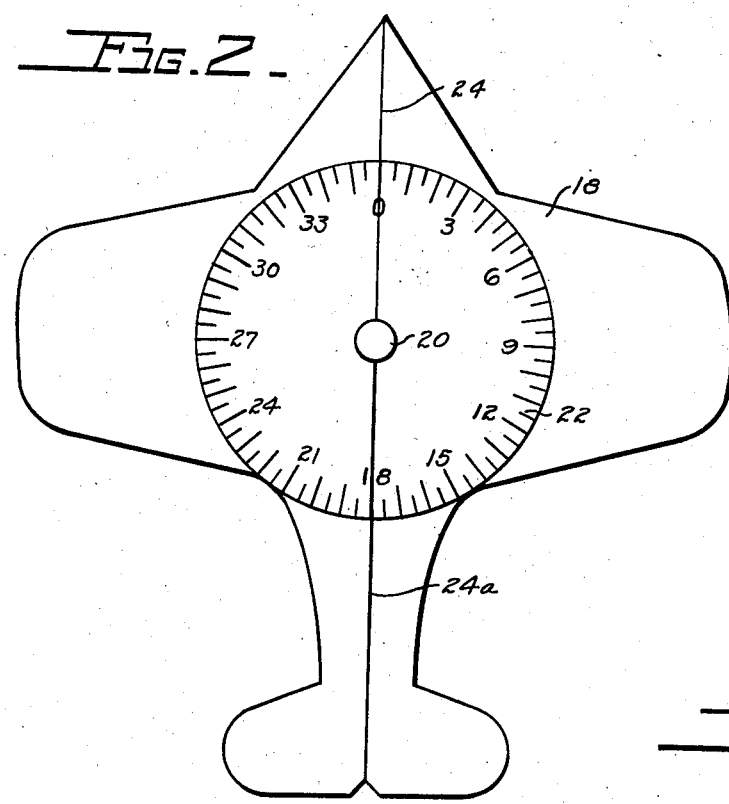
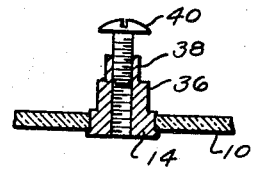
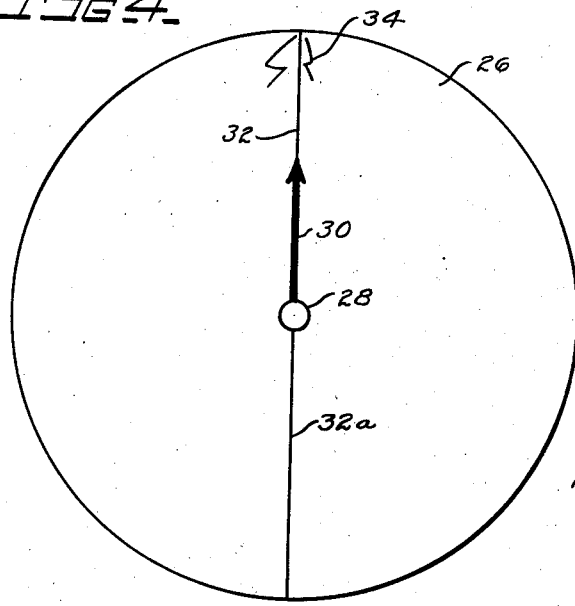
INVENTORS
JOSEPH LEVINE
AND RONDAL E. WELLS
BY
ATTORNEYS

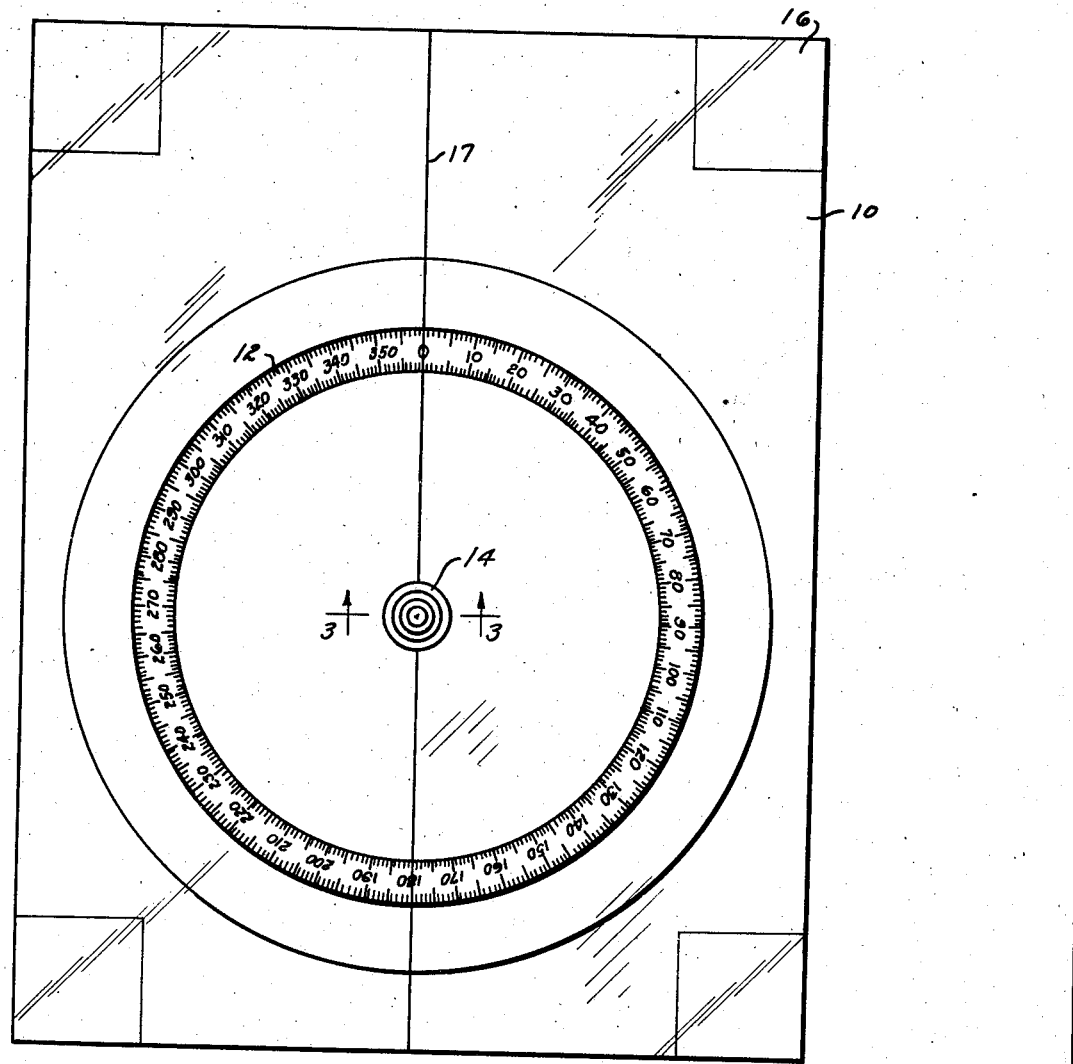

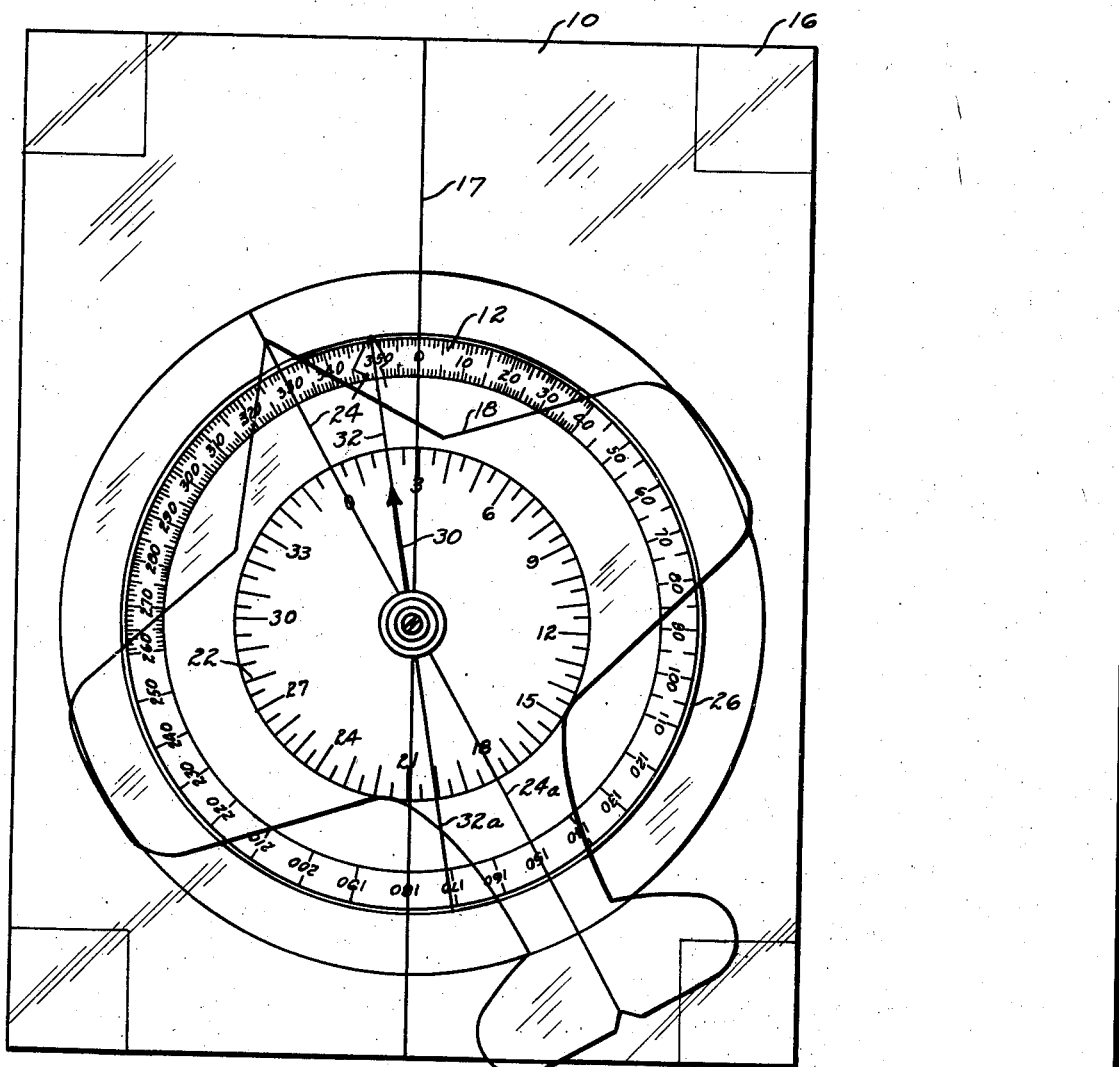

Patented July 23, 1946

2,404,386

UNITED STATES PATENT OFFICE 2,404,386

DEVICE TO AID TEACHING OF AUTOMATIC RADIO COMPASS

Joseph Levine, Brooklyn, N. Y., and Rondal E. Wells, Sheridan, Wyo.

Application March 22, 1945, Serial No. 584,224

1 Claim. (Cl. 35—39)

(Granted under the act of March 3, 1883, as amended April 30, 1928; 370 O. G. 757)

The invention described herein may be manufactured and used by or for Government for governmental purposes, without the payment to us of any royalty thereon.

This invention relates to a navigational device particularly useful as an aid in teaching the use of the automatic direction finder and aural null procedures, although it may also be used as a computer in connection with these procedures.

An object of the invention is to show clearly the relation between (1) "Heading," (2) "Radio compass reading," and (3) "Bearing."

Other objects and advantages will be apparent from a consideration of the following description, taken in conjunction with the drawings, wherein:

Fig. 1 is a detail plan view of the base of the device which carries the azimuth scale of three hundred sixty degrees, and the pivot means upon which the other two parts rotate.

Fig. 2 is a detail plan view of a representation of an airplane which is rotatable on the pivot means of Fig. 1, and carries a dial representation of the dial of a radio compass.

Fig. 3 is a section taken at 3—3 of Fig. 1 through the stud which is assembled with the base to provide the pivot means for the other rotatable parts.

Fig. 4 is a circular runner, which also rotates on the pivot means of Fig. 1 and carries a pointer which is representative of the pointer of the radio compass, the hairline of the runner being coincident with the pointer.

Fig. 5 is an assembly of the device set up to illustrate the relationship of the factors involved.

Like reference characters refer to like parts throughout the several views.

In the drawings, a base 10 of relatively thick sheet transparent plastic material carries an azimuth scale 12 graduated in degrees from 0 to 360°. A pivot stud 14, concentric with respect to the scale 12, is fast in the base and provides rotative bearing for the other parts of the device. Feet 16 are provided at the corners of the base. A hairline 17 extends across the base through 0° and 180° on the azimuth scale.

A top plan view representation of an airplane 18, also made from a relatively heavy sheet of transparent plastic material, has a central opening 20 which is rotatably fitted to the stud 14. The plane 18 carries a dial 22 which is representative of the dial of a conventional radio compass and is concentric with the opening 20. A hairline 24, 24a extends from nose to tail through the axis of the opening 20 and the dial is fixed to the plane with 0° on that part of the hairline which runs to the nose and 180° on that part of the hairline which runs to the tail.

The third or top member of the device consists of a circular transparent plastic disc 26 having a central bearing opening 28 and an outside diameter of substantially the diameter of the outside of the azimuth scale 12. A pointer 30 is engraved on this disc 26, preferably on the underside, which is representative of the pointer on a conventional radio compass. A diametral hairline 32, 32a also preferably on the underside of the disc, passes through the axis of the bearing opening and the center of the pointer. A representation 34 of a radio station is shown on the part 32 of the hairline.

In assembling the several parts of the device, the airplane 18 is first assembled with the base 10 by placing the opening 20 over the bearing 36 of the stud 14, then the runner 26 is assembled on the airplane 18 with its central opening 28 over the smaller bearing 38 of the stud 14, after which the insertion of the screw 40 completes the assembly. The axial length of the bearings 36 and 38 is great enough that the parts 10, 18, and 26 do not rub too hard one on the other upon relative rotation therebetween. The complete assembly of the device is shown in Fig. 5.

The operation of the device is as follows:

In any problem (1) "Heading" will be indicated by the position of the hairline 24 of the plane read on the azimuth scale 12 of the base, (2) "Radio compass reading" will be indicated by the position of the pointer 30 of the runner on the radio compass dial 22 on the plane, and (3) "Bearing" will be indicated by the position of the hairline 32, 32a, on the azimuth scale 12, "Ship to station" bearing being read on the scale 12 at the part 32 of the hairline, while "Station to ship" bearing will be read at the part 32a.

Several illustrative problems follow:

(1) Given "Heading" and "Radio compass reading" to find "Bearing"—

Set up "Heading" by placing the hairline 24 of the plane at the given angle on the azimuth scale 12. Rotate the runner 26 until the pointer 30 points to the proper "Radio compass reading" on the radio compass dial 22. "Bearing" may now be read directly on the azimuth scale 12 at the hairline 32.

(2) To select a heading which will make good a predetermined "Bearing," given "Radio compass reading" and "Bearing" to be made good.

Set up "Bearing" by setting hairline portion 32 to the figure given. Rotate the plane 18 until the radio compass pointer 30 reads the given figure on the dial 22 and "Heading" can be read directly on the azimuth scale 12 at the hairline 24.

Having described our invention with several examples of its operation, we claim:

A device of the character described, which comprises a base, a pivot means extending from said base, an azimuth scale, graduated from 0 to 360 degrees, directly on said base concentric with said pivot means, a hairline on said base extending through 0 and 180 degrees of said graduation, a transparent image of an airplane slightly longer from nose to tail than the diameter of said azimuth scale and having a medial hairline extending from nose to tail and bearing means for rotation of said image about said pivot means located on said hairline, a facsimile of a radio compass dial smaller than said azimuth scale carried on said image concentric with said bearing means, a circular transparent runner of substantially the diameter of said azimuth scale having a diametral hairline, bearing means at the center of said runner for rotation of said runner about said pivot means, and a replica of a radio compass pointer carried on said runner and extending radially from said bearing means along said diametral hairline.

JOSEPH LEVINE.
RONDAL E. WELLS.